(12) United States Patent
Lee et al.

(10) Patent No.: US 8,639,193 B2
(45) Date of Patent: Jan. 28, 2014

(54) TRI-STATE CONTROL FOR A LINE DRIVER

(75) Inventors: Sang-Min Lee, Palo Alto, CA (US); Michael Peter Mack, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 13/340,365

(22) Filed: Dec. 29, 2011

(65) Prior Publication Data

US 2013/0169316 A1 Jul. 4, 2013

(51) Int. Cl.
*H04B 1/40* (2006.01)

(52) U.S. Cl.
USPC ............ 455/74; 455/84; 455/127.3; 455/311; 455/333; 455/338; 455/341; 455/78; 327/108; 327/534; 327/563; 326/82; 326/86; 375/219; 375/258; 330/10; 330/251; 330/253

(58) Field of Classification Search
USPC ............ 455/73, 78, 84, 311, 127.3, 333, 338, 455/341
See application file for complete search history.

(56) References Cited

U.S. PATENT DOCUMENTS

| | | | |
|---|---|---|---|
| 5,263,049 A | 11/1993 | Winen | |
| 5,444,410 A | 8/1995 | Polhemus | |
| 5,896,417 A * | 4/1999 | Lau | 375/258 |
| 6,396,610 B1 * | 5/2002 | Okayasu | 398/164 |
| 6,744,320 B2 * | 6/2004 | Nguyen et al. | 330/254 |
| 7,605,610 B2 * | 10/2009 | Oh et al. | 326/86 |
| 7,663,398 B1 | 2/2010 | Lee et al. | |
| 7,711,939 B2 * | 5/2010 | Canagasaby et al. | 713/1 |
| 7,737,788 B1 * | 6/2010 | Roo et al. | 330/311 |
| 7,821,297 B2 * | 10/2010 | Isik et al. | 326/86 |
| 7,848,724 B2 * | 12/2010 | Bult et al. | 455/252.1 |
| 7,996,590 B2 * | 8/2011 | Lee | 710/100 |
| 8,005,437 B2 * | 8/2011 | Rofougaran | 455/76 |
| 8,185,066 B2 * | 5/2012 | Camp et al. | 455/114.3 |
| 8,229,367 B2 * | 7/2012 | Chan et al. | 455/78 |
| 8,489,052 B2 * | 7/2013 | Bult et al. | 455/252.1 |

FOREIGN PATENT DOCUMENTS

WO 2013101934 7/2013

OTHER PUBLICATIONS

International Search Report and Written Opinion—PCT/US2012/071829—ISA/EPO—Apr. 18, 2013.

\* cited by examiner

*Primary Examiner* — Marceau Milord
(74) *Attorney, Agent, or Firm* — DeLizio Gilliam, PLLC

(57) ABSTRACT

A tri-state control mechanism can be implemented for a line driver of a transmitter unit to switch the output impedance of the transmitter unit between a low impedance state in the transmit mode and a high impedance state in the receive mode while minimizing turn-off glitch. It may be determined whether a communication device comprising the transmitter unit is configured in a transmit operating mode or a receive operating mode. If the communication device is configured in the receive operating mode, a first bias voltage can be generated to bias output transistors of the line driver circuit in a sub-threshold state. If the communication device is configured in the transmit operating mode, a second bias voltage can be generated to bias output transistors of the line driver circuit in a saturation state.

24 Claims, 5 Drawing Sheets

FIG. 1

TRI-STATE CONTROL FOR A LINE DRIVER

BACKGROUND

Embodiments of the inventive subject matter generally relate to the field of communication devices and, more particularly, to tri-state control for a line driver.

Communication devices comprise a transmitter and a receiver that typically share a common communication medium for transmitting or receiving signals. For a wired communication network, the output impedance of the transmitter should be low in order to drive the low impedance communication medium. A low impedance at the output of the transmitter (e.g., at a line driver circuit) can enable a signal that is to be transmitted to be properly coupled to the communication medium. However, when the receiver is receiving a signal via the communication medium, the output impedance of the transmitter should be high to ensure that the received signal is coupled to the receiver and not to the transmitter.

SUMMARY

Various embodiments of a tri-state control mechanism for a line driver are disclosed. In one embodiment, a communication device comprises a receiver unit operable to receive one or more signals via a communication medium when the communication device is configured in a receive operating mode. The communication device also comprises a transmitter unit operable to transmit one or more signals via the communication medium when the communication device is configured in a transmit operating mode. The transmitter unit comprises a line driver circuit operable to amplify the one or more signals transmitted via the communication medium when the communication device is configured in the transmit operating mode. The transmitter unit also comprises a biasing circuit coupled with the line driver circuit. The biasing circuit is operable to generate a first bias voltage to bias output transistors of the line driver circuit in a sub-threshold state in response to receiving a first control signal when_the communication device is configured in the receive operating mode. The biasing circuit is operable to generate a second bias voltage to bias output transistors of the line driver circuit in a saturation state in response to receiving a second control signal when the communication device is configured in the transmit operating mode.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
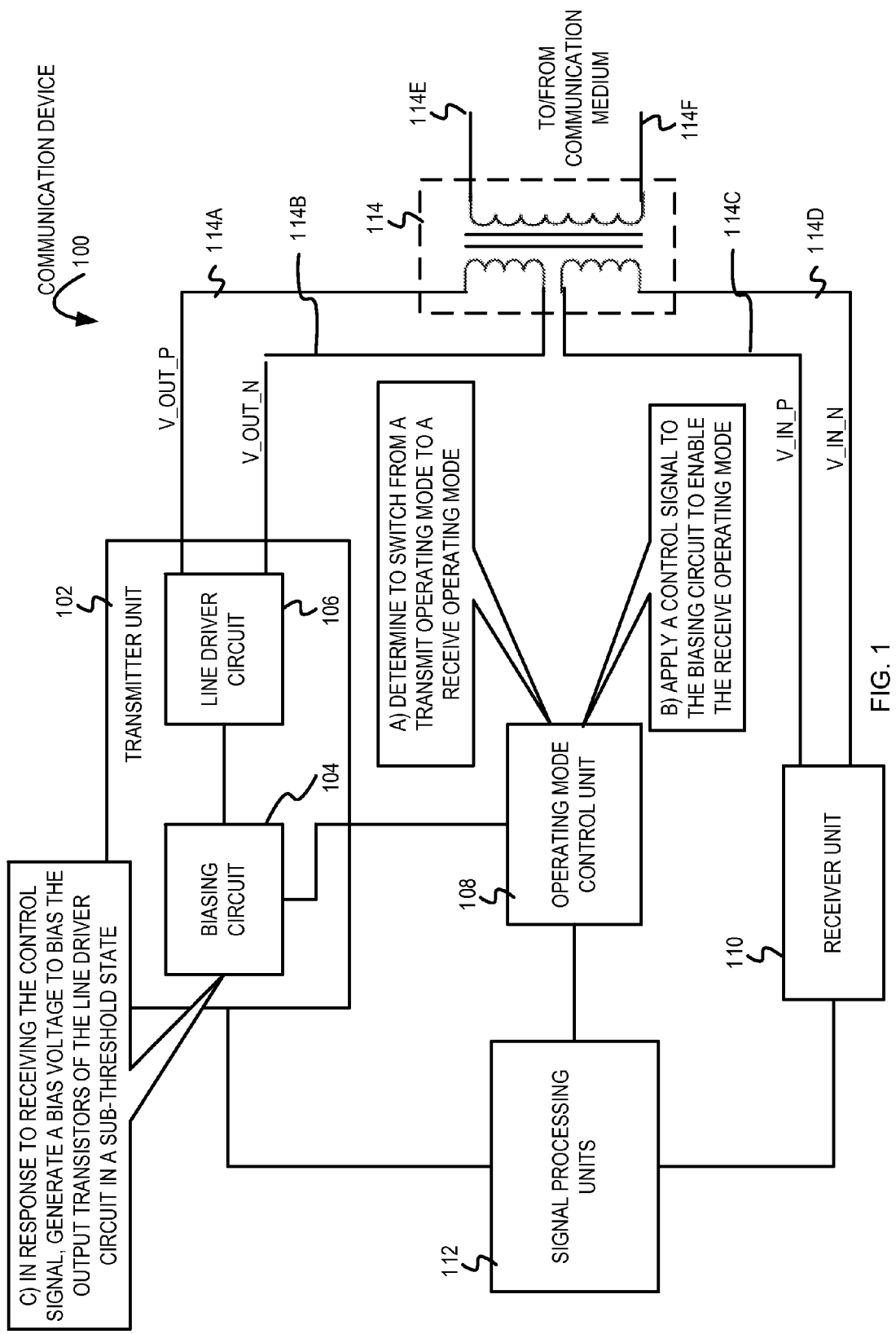
FIG. 1 is a block diagram illustrating an example mechanism for tri-state control of a line driver circuit.

The description that follows includes exemplary systems, circuits, methods, techniques, instruction sequences, and computer program products that embody techniques of the present inventive subject matter. However, it is understood that the described embodiments may be practiced without these specific details. For instance, although examples refer to a tri-state control mechanism for line drivers in powerline communication (PLC) devices, embodiments are not so limited. In other embodiments, other suitable communication devices (e.g., Ethernet devices) can implement the tri-state control mechanism described herein. In other instances, well-known instruction instances, protocols, structures, and techniques have not been shown in detail in order not to obfuscate the description.

Depending on whether a communication device is configured in a transmit mode or a receive mode, the output impedance of the transmitter unit is typically switched between a low impedance state and a high impedance state, respectively. The transmitter unit being in the low impedance state in the transmit mode can ensure that signals to be transmitted are coupled to the communication medium. Likewise, the transmitter unit being in the high impedance state in the receive mode can ensure that received signals are coupled to the receiver unit (and not to the transmitter unit). In the receive mode, the output transistors of the line driver associated with the transmitter unit are typically switched off (i.e., biased in the cut-off state) so that the output impedance of the transmitter unit is very high (ideally infinite). However, it can be very difficult to switch off both of the output transistors (e.g., pull-up transistors and pull-down transistors) of the line driver simultaneously. In some instances, after one of the output transistors is switched off, the other output transistor may still conduct and may be coupled with the power supply or with the reference ground level. This can cause the output common mode voltage of the line driver to drift towards the power supply voltage level or towards the reference ground voltage level, resulting in a "turn-off glitch." Such turn-off glitches can disturb the communication medium and disrupt communications in the communication medium.

A tri-state control mechanism can be implemented for the line driver to switch the output impedance of the transmitter unit between a low impedance state in the transmit mode and a high impedance state in the receive mode. Instead of biasing the output transistors of the line driver in the cut-off state (i.e., switching off the output transistors), the output transistors of the line driver can be initially biased in a sub-threshold state when switching from the low impedance state to a high impedance state at the transmitter unit, as will be further described below with reference to FIGS. 1-5. The sub-threshold state can be an intermediate operating state between the cut-off state (where the output transistors are switched off) and the saturation state. Because the output transistors of the line driver are not entirely switched off in the sub-threshold state, the output transistors typically conduct a negligible amount of leakage current. Allowing the output transistors of the line driver circuit to conduct a negligible amount of leakage current can minimize the turn-off glitches encountered when attempting to switch both output transistors off simultaneously. Also, because the output transistors of the line driver are not completely switched on in the sub-threshold state, the output impedance associated with the transmitter unit is high enough to prevent/minimize coupling of received signals with the transmitter unit. By biasing the output transistors of the line driver in the sub-threshold state, the time instants at which each of the output transistors is switched to the sub-threshold state need not be synchronized. Such a control mechanism can enable the transmitter unit to switch between the low impedance state and the high impedance state while minimizing transients and turn-off glitches. This can reduce the disturbance of the communication medium.

FIG. 1 is a block diagram illustrating an example mechanism for tri-state control of a line driver circuit. FIG. 1 depicts a communication device 100 comprising a transmitter unit 102 and a receiver unit 110. The transmitter unit 102 comprises a biasing circuit 104 and a line driver circuit 106. The communication device 100 also comprises an operating mode control unit 108, signal processing units 112 and a transformer 114. The transmitter unit 102, the receiver unit 110, and the operating mode control unit 108 are coupled with the signal processing units 112. The transmitter unit 102 and the receiver unit 110 are also coupled with the communication medium via the transformer 114. The transformer 114 comprises two primary ports and one secondary port. Terminal 114A (V_OUT_P) and terminal 114B (V_OUT_N) constitute the first primary port of the transformer 114 and are coupled to the transmitter unit 102. Terminal 114C (V_IN_P) and terminal 114D (V_IN_N) constitute the second primary port of the transformer 114 and are coupled to the receiver unit 110. Terminal 114E and terminal 114F constitute the secondary port of the transformer 114. Thus, the transmitter unit 102 and the receiver unit 110 form a fully differential circuit. In one implementation, the communication device 100 may be a powerline communication (PLC) device and the transformer 114 can couple the PLC device 100 to the powerline medium. In other implementations, the communication device 100 can implement other suitable communication standards (e.g., the communication device 100 may be an Ethernet device) and may be coupled with a suitable communication medium (e.g., an Ethernet network) using other coupling mechanisms, in addition to or instead of the powerline communication medium. It is noted that in some implementations, the transmitter unit 102 and the receiver unit 110 may share one or more components of the signal processing units 112. In some implementations, the transmitter unit 102 and the receiver unit 110 can be coupled with the communication medium using a 1:1 transformer. In another implementation, the transmitter unit 102 (e.g., the line driver circuit 106) and the receiver unit 110 can be directly coupled with the communication medium. Furthermore, although depicted separate from the signal processing units 112, in some implementations, the operating mode control unit 108 can be implemented as part of the signal processing units 112. The communication device 100 can be configured to operate in a transmit operating mode (where the transmitter unit 102 is enabled to transmit PLC signals) or a receive operating mode (where the transmitter unit 102 is configured in a high impedance state to allow reception of PLC signals by the receiver unit 110). As will be further described below in stages A, B, and C, depending on the operating mode of the communication device 100, the bias current (or the bias voltage) applied to the line driver circuit 106 can be varied to switch the transmitter unit 102 between a low impedance transmit operating mode and a high impedance receive operating mode.

At stage A, the operating mode control unit 108 determines to switch the communication device 100 from the transmit operating mode to the receive operating mode. In some implementations, the operating mode control unit 108 can be configured to switch the operating mode of the communication device 100 at periodic intervals (e.g., every 500 milliseconds). In other implementations, the operating mode control unit 108 can be configured to switch the operating mode of the communication device 100 based on whether there are pending communications and/or based on a previously determined communication schedule. For example, the communication device 100 may be configured in the transmit operating mode when the communication device 100 is scheduled to transmit PLC signals. To configure the communication device 100 in the receive operating mode, the operating mode control unit 108 can configure the transmitter unit 102 in the high impedance state so that the received PLC signals are coupled to the receiver unit 110.

At stage B, the operating mode control unit 108 applies an operating mode control signal to the biasing circuit 104 to configure the communication device 100 in the receive operating mode. As described above, when the communication device 100 is configured in the receive operating mode, the transmitter unit 102 is typically configured in the high impedance state to avoid coupling the received PLC signals to the transmitter unit 102 instead of the receiver unit 110. In other words, when the communication device 100 is configured in the receive operating mode, the transmitter unit 102 should be configured to present a high output impedance to the powerline medium. In response to determining to configure the communication device 100 in the receive operating mode, the operating mode control unit 108 can apply a predetermined operating mode control signal to the biasing circuit 104. In response to receiving the predetermined operating mode control signal, the biasing circuit 104 can generate a bias voltage to bias the output transistors of the line driver circuit 106 between the cut-off (i.e., completely OFF) state and the saturation state. In other words, the biasing circuit 104 can bias the output transistors of the line driver circuit 106 in the "sub-threshold" state, as will be described below in stage C of FIG. 1 and in FIG. 2.

Figure 2A:
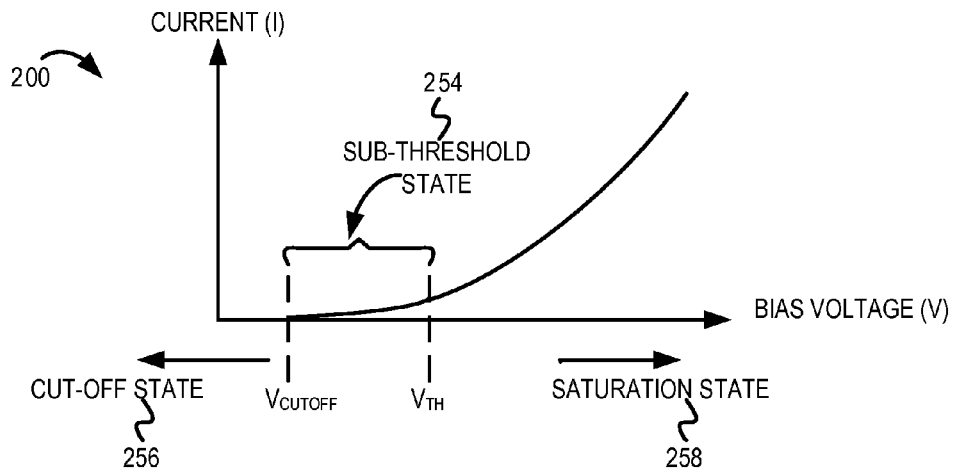
FIG. 2A is an example graph illustrating I-V characteristics and operating states of a transistor.

At stage C, in response to receiving the operating mode control signal, the biasing circuit 104 generates a bias voltage to bias the output transistors of the line driver circuit 106 in a sub-threshold state. Referring to FIG. 2A, the graph 200 illustrates example I-V characteristics and operating states of a transistor. A transistor is typically associated with a cut-off voltage ($V_{cutoff}$). The transistor can be configured in the cut-off state 256 if the bias voltage applied to the transistor is less than the cut-off voltage (as shown in FIG. 2A). Once biased in the cut-off state 256, the transistor stops conducting current and is considered to be in the "OFF" (or open switch) state. The output impedance associated with the transmitter unit 102 when the output transistors are biased in the cut-off state 256 is very high (ideally infinite). A transistor is also typically associated with a threshold voltage ($V_{threshold}$). The transistor can be configured in the saturation state 258 if the bias voltage applied to the transistor is greater than the threshold voltage (as shown in FIG. 2A). The output impedance associated with the transmitter unit 102 when the output transistors are biased in saturation state 258 is very low. When the bias voltage applied to the transistor is between the cut-off voltage and the threshold voltage, the transistor conducts a negligible amount of leakage current. The operating state between the cut-off state 256 (i.e., the OFF state) and the saturation state 258 is referred to as the sub-threshold state 254. Although the output impedance associated with the sub-threshold state is not as high as output impedance associated with the cutoff state, the output impedance associated with the transmitter unit 102 when the output transistors are biased in the sub-threshold state 254 is high enough to minimize coupling between the powerline medium and the transmitter unit 102 during the receive operating mode.

Referring back to FIG. 1, in response to the predetermined operating mode control signal, the biasing circuit 104 can generate and apply an appropriate sub-threshold bias voltage (or a sub-threshold bias current) to the line driver circuit 106. The sub-threshold bias voltage can ensure that the output transistors of the line driver circuit 106 are not completely switched off, but are instead biased in the sub-threshold state to minimize turn-off glitch (that can be generated when the output transistors of the line driver circuit 106 are switched off, or in other words, during the turn off transient) and to ensure proper coupling of the received PLC signal with the receiver unit 110. Example embodiments and operations of the biasing circuit 104 and the line driver circuit 106 are further described in FIGS. 2 and 3.

It is noted that on determining to switch the communication device 100 from the receive operating mode to the transmit operating mode, the operating mode control unit 108 can enable the transmitter unit 102 (and can disable the receiver unit 110) so that the PLC signals are coupled from the transmitter unit 102 to the powerline medium. In other words, when the communication device 100 is configured in the transmit operating mode, the transmitter unit 102 should be configured to present a low output impedance to the powerline medium so that the PLC signals are coupled to the powerline medium. In response to determining to configure the communication device 100 in the transmit operating mode, the operating mode control unit 108 can apply a second predetermined operating mode control signal to the biasing circuit 104 so that the output transistors of the line driver circuit 106 are biased in the saturation state 258. In one implementation, the operating mode control unit 108 can comprise two preset bias settings (e.g., the first predetermined operating mode control signal associated with a sub-threshold bias setting and the second predetermined operating mode control signal associated with a saturation bias setting). In one example, the operating mode control unit 108 can use a multiplexer to select one of the settings (e.g., based on the operating mode of the communication device 100). The operating mode control unit 108 can apply the selected setting to the biasing circuit 104 to switch the bias of the output transistors of the line driver circuit 106 between the sub-threshold bias setting and the saturation bias setting.

Figure 2B:
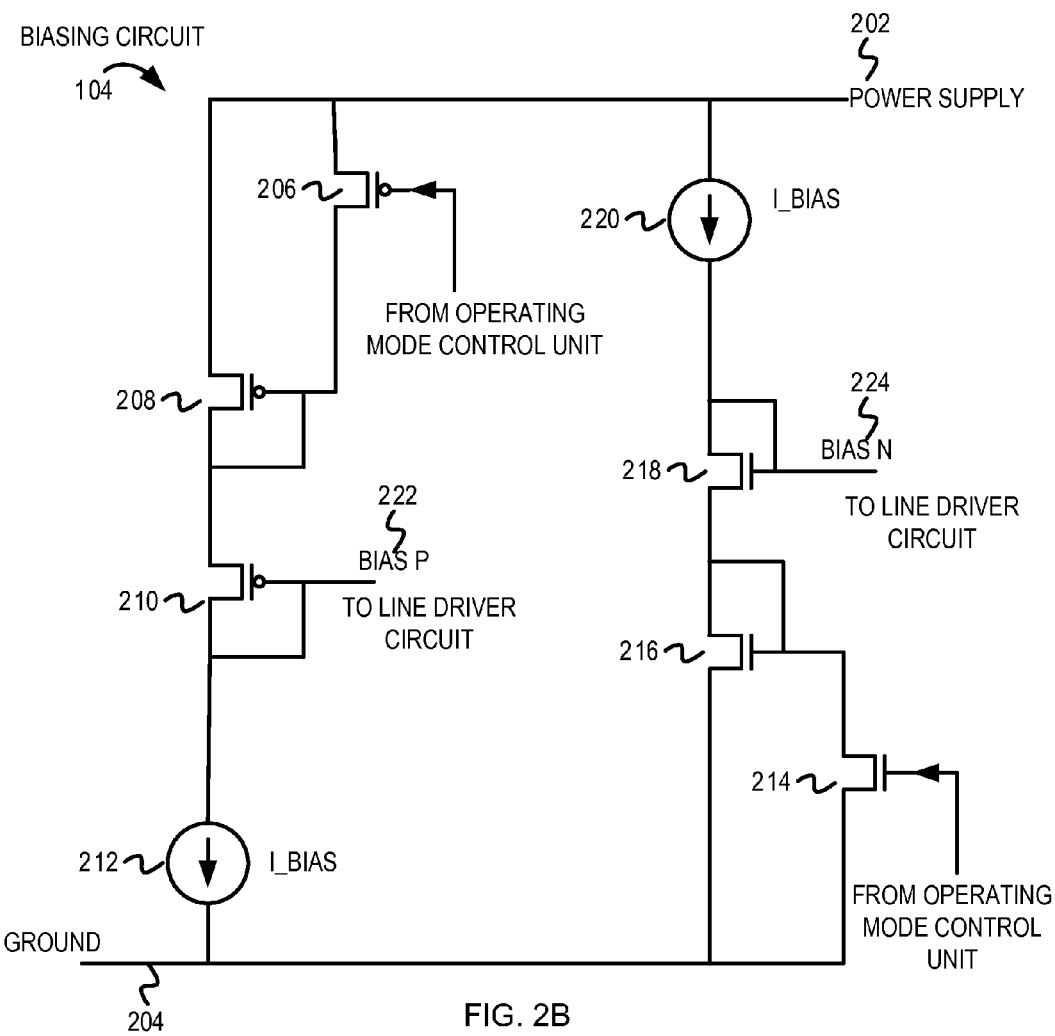
FIG. 2B is an example circuit diagram illustrating one embodiment of a biasing circuit.

FIG. 2B is an example circuit diagram illustrating one embodiment of the biasing circuit 104. In one example, as depicted in FIG. 2B, the biasing circuit 104 can comprise a class AB amplifier biasing circuit. In this example, the biasing circuit 104 comprises diode-connected p-channel metal oxide semiconductor field effect transistors (also known as p-MOSFET or PMOS) 208 and 210. The diode-connected PMOS 208 comprises the drain terminal of the PMOS 208 shorted with the gate terminal of the PMOS 208. Likewise, the diode-connected PMOS 210 comprises the drain terminal of the PMOS 210 shorted with the gate terminal of the PMOS 210. The source terminal of the PMOS 208 is coupled with the power supply 202. The source terminal of the PMOS 210 is coupled with the shorted gate-drain terminal of the PMOS 208. The shorted gate-drain terminal of the PMOS 210 is coupled with a reference ground terminal 204 via a bias current (I_BIAS) 212. Additionally, the PMOS 208 is also coupled with a switch PMOS 206. A first terminal of the PMOS 206 is coupled with the shorted gate-drain terminal of the PMOS 208. A second terminal of the PMOS 206 is coupled with the power supply 202. An operating mode control signal (e.g., from the operating mode control unit 108 of FIG. 1) is provided to the gate terminal of the PMOS 206. A bias voltage (represented as BIAS_P 222) is generated at the gate terminal of the PMOS 210 and is provided to the line driver circuit 106 (depicted in FIG. 3). The corresponding bias voltage 222 generated by such a combination of the PMOS 208, PMOS 210, and I BIAS 212 is depicted in FIG. 2B.

Figure 3:
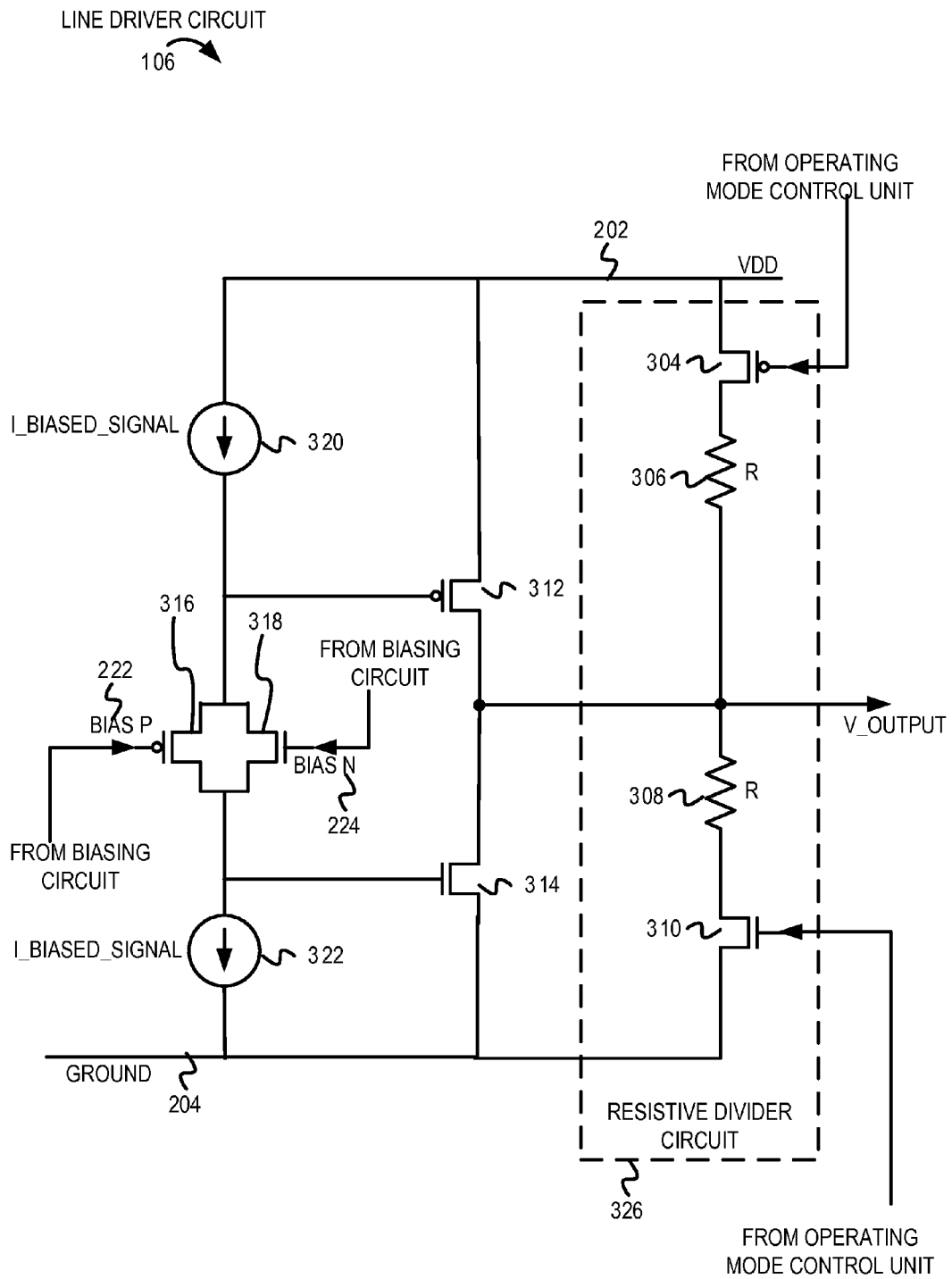
FIG. 3 is an example circuit diagram illustrating one embodiment of a line driver circuit.

FIG. 2B also comprises diode-connected n-channel MOSFETs (also known as n-MOSFET or NMOS) 216 and 218. The diode-connected NMOS 218 comprises the drain terminal of the NMOS 218 shorted with the gate terminal of the NMOS 218. Likewise, the diode-connected NMOS 216 comprises the drain terminal of the NMOS 216 shorted with the gate terminal of the NMOS 216. The shorted gate-drain terminal of the NMOS 218 is coupled with the power supply 202 via a bias current (I_BIAS) 220. The source terminal of the NMOS 218 is coupled with the shorted gate-drain terminal of the NMOS 216. The source terminal of the NMOS 216 is coupled with the reference ground terminal 204. Additionally, the NMOS 216 is also coupled with a switch NMOS 214. A first terminal of the NMOS 214 is coupled with the shorted gate-drain terminal of the NMOS 216. A second terminal of the NMOS 214 is coupled with the reference ground terminal 204. An operating mode control signal (e.g., from the operating mode control unit 108) is provided to the gate terminal of the NMOS 214. A bias voltage (represented as BIAS_N 224) is generated at the gate terminal of the NMOS 218 and is provided to the line driver circuit 106 (as illustrated in FIG. 3). The corresponding bias voltage 224 generated by such a combination of the NMOS 216, NMOS 218, and I BIAS 220 is depicted in FIG. 2B.

As described above, in response to determining to bias the output transistors of the line driver circuit 106 in the sub-threshold state 254 (i.e., on determining to configure the communication device 100 in the receive operating mode), the operating mode control unit 108 can provide a predetermined operating mode control signal to the PMOS 206 and the NMOS 214. Typically, the predetermined operating mode control signals applied to the PMOS 206 and the NMOS 214 are inverses of each other. In other words, if a high voltage level operating mode control signal (e.g., a digital "1") is applied to the NMOS 214, a low voltage level operating mode control signal (e.g., a digital "0") is typically applied to the PMOS 206. The high voltage operating mode control signal serves to bias the NMOS 214 in the linear (or triode) state 258 (i.e., switch on the NMOS 214). Likewise, the low voltage operating mode control signal serves to bias the PMOS 206 in the linear (or triode) state 258 (i.e., switch on the PMOS 206). This, in turn, causes the PMOS 208 to be directly coupled to the power supply 202 and the NMOS 216 to be directly coupled to the reference ground terminal 204. In other words, applying the operating mode control signal to the PMOS 206 and the NMOS 214 serve to short the PMOS 208 and the NMOS 216, respectively. Accordingly, the biasing circuit 104 generates bias voltages 222 and 224 across the gate and source terminals of the PMOS 210, and the gate and the source terminal of the NMOS 218, respectively to bias PMOS 312 and NMOS 314 in a sub-threshold mode. In some implementations, the sub-threshold bias voltage can be any suitable voltage between the cut-off voltage and the threshold voltage.

In one implementation, when the communication device 100 is configured in the transmit operating mode and the output transistors 312 and 314 of the line driver circuit 106 are to be biased in the saturation state 258, the biasing circuit 104 can provide a bias voltage (e.g., a gate-source voltage or Vgs) that is the sum of twice the threshold voltage (Vth) and twice an overdrive voltage (Vov). In the transmit operating mode, the operating mode control PMOS 206 and the operating mode control NMOS 214 are disabled (e.g., operate as open switches). Therefore, the PMOS 208 and the PMOS 210 can together generate the BIAS_P voltage 222 of 2Vgs, where 2Vgs=2Vth+2Vov. Likewise, the NMOS 216 and the NMOS 218 can together generate the BIAS_N voltage 224 of 2Vgs. The BIAS_P voltage 222 and the BIAS_N voltage 224 can be provided to the line driver circuit 106 to ensure that the output transistors of the line driver circuit are biased in the saturation state 258 for normal operation.

When the communication device 100 is configured in the receive operating mode, the output transistors of the line driver circuit 106 are to be biased in the sub-threshold state 254. In the receive operating mode, the operating mode control PMOS 206 and the operating mode control NMOS 214 are enabled (e.g., operate as closed switches) thus shorting the PMOS 208 and the NMOS 216, respectively. By shorting the PMOS 208, the PMOS 210 can generate the BIAS_P voltage 222 of 1Vgs, where 1Vgs=1Vth+1Vov. Similarly, by shorting the NMOS 216, the NMOS 218 of the biasing circuit 104 can generate the BIAS_N voltage 224 of 1Vgs. The BIAS_P voltage 222 and the BIAS_N voltage 224 can be provided to the line driver circuit 104. However, because the bias voltage provided to the output transistors of the line driver circuit 104 is less than the bias voltage that may be needed for operation in the saturation state 258, the output transistors 312 and 314 of the line driver circuit 106 are neither biased in the saturation state 258 nor biased in the cut-off state 256. Providing this bias voltage to the output transistors of the line driver circuit 106 can bias the output transistors 312 and 314 in the sub-threshold state 254, as will be further described below in FIG. 3.

FIG. 3 is an example circuit diagram illustrating one embodiment of the line driver circuit 106. In one example, as depicted in FIG. 3, the line driver circuit 106 can comprise a class AB amplifier. The PMOS 312 is biased by the BIAS_P voltage 222 via PMOS 316, and the NMOS 314 is biased by the BIAS_N voltage 224 via NMOS 318. The BIAS_P voltage 222 and the BIAS_N voltage 224 are generated by the biasing circuit 104 of FIG. 2B. The gate terminal of the PMOS 210 of FIG. 2B is coupled with the gate terminal of the PMOS 316. The gate terminal of the NMOS 218 of FIG. 2B is coupled with the gate terminal of the NMOS 318. The drain terminal of the PMOS 316 and the source terminal of NMOS 318 are connected to each other and are coupled with the reference ground terminal 204 via biasing signal (I_BIASED_SIGNAL) 322. The drain terminal of the NMOS 318 and the source terminal of PMOS 316 are connected to each other and are coupled with the power supply 202 via biasing signal (I_BIASED_SIGNAL) 320. FIG. 3 also comprises a PMOS 312 and an NMOS 314 configured as a class AB output stage. The PMOS 312 and the NMOS 314 are the output transistors of the line driver circuit 106. The source terminal of the PMOS 312 is coupled with the power supply 202 and the source terminal of the NMOS 314 is coupled with the reference ground terminal 204. The drain terminal of the PMOS 312 is coupled with the drain terminal of the NMOS 314 and with an output terminal of the line driver 106. The gate terminal of the PMOS 312 is coupled with the junction of the source terminal of the PMOS 316 and the drain terminal of the NMOS 318. The gate terminal of the NMOS 314 is coupled with the junction of the source terminal of the NMOS 318 and the drain terminal of the PMOS 316.

As described above in the example of FIG. 2B, during the transmit operating mode, the operating mode control unit 108 can provide a first operating mode control signal to turn off transistors 206 and 214 of the biasing circuit 104. Accordingly, the biasing circuit 104 can generate and provide a bias voltage of 2Vgs to bias the output transistors (i.e., the PMOS 312 and the NMOS 314) of the line driver circuit 106 in the saturation state. Once biased in the saturation state, the PMOS 312 and the NMOS 314 conducts current, lowering the output impedance of the transmitter unit 102, so that PLC signals to be transmitted are coupled to the powerline medium. During the receive operating mode, the operating mode control unit 108 can provide a second operating mode control signal to enable the operating mode transistors 206 and 214 of the biasing circuit 104. Accordingly, the biasing circuit 104 can generate and provide a bias voltage of 1Vgs (rather than a bias voltage of 0Vgs, which would bias 312 and 314 in cutoff state) to bias the output transistors (i.e., the PMOS 312 and the NMOS 314) of the line driver circuit 106 in the sub-threshold state. Once biased in the sub-threshold state, the PMOS 312 and the NMOS 314 conduct very little leakage current, elevating the output impedance of the transmitter unit 102 in comparison to the receiver unit 110, so that received PLC signals are coupled from the powerline medium to the receiver unit 110 and not to the transmitter unit 102.

The line driver circuit 106 also comprises a resistive divider circuit 326. The resistive divider circuit 326 comprises resistors 306 and 308, a PMOS 304, and an NMOS 310. The PMOS 304 and the NMOS 310 work as switches. In other words, based on an operating mode control signal (e.g., from the operating mode control unit 108 of FIG. 1), the PMOS 304 and the NMOS 310 can switch the resistors 306 and 308, respectively, into or out of the line driver circuit 106. In one implementation, as depicted in FIG. 3, the drain terminal of the PMOS 304 can be coupled with the power supply 202, the source terminal of the PMOS 304 can be coupled with one terminal of the resistor 306, and the operating mode control signal (e.g., from the operating mode control unit 108) can be provided to the gate terminal of the PMOS 304. Likewise, the drain terminal of the NMOS 310 can be coupled with the reference ground terminal 204, the source terminal of the NMOS 310 can be coupled with one terminal of the resistor 308, and the operating mode control signal can be provided to the gate terminal of the NMOS 310. The other terminals of the resistors 306 and 308 can be connected to each other and to the output terminal of the line driver 106.

In some implementations, various mismatch issues (e.g., the leakage current of the PMOS 312 being different from the leakage current of the NMOS 314) can result in an output common mode voltage when the output transistors (i.e., the PMOS 312 and the NMOS 314) of the line driver circuit 106 are biased in the sub-threshold state. Typically, the output common mode voltage should be maintained at a midpoint between the power supply and the reference ground levels. However, when the output transistors of the line driver circuit 106 are biased in the sub-threshold state, the output common mode voltage can drift towards the power supply voltage level (e.g., +3V) or towards the reference ground level (e.g., 0V). To maintain a constant output common mode voltage when the output transistors of the line driver circuit 106 are biased in the sub-threshold state, the resistive divider circuit 326 can be switched in to drive the positive output terminal and the negative output terminal of the line driver circuit 106. This can ensure that the voltage at the output of the line driver circuit 106 is at a common mode voltage and is not at the power supply voltage level or the reference ground level. For example, during the receive operating mode, the operating mode control unit 108 can provide the operating mode control signal to the gate terminal of the PMOS 310 and the gate terminal of the NMOS 304 (also provided to the gate terminals of the PMOS 206 and the NMOS 214 of FIG. 2B). As described above, the operating mode control signals applied to the PMOS 304 and the NMOS 310 can be inverses of each other. In other words, if a digital "0" is applied to switch on the PMOS 304, a digital "1" can be applied to switch on the NMOS 310. The operating mode control signal serves to switch on the PMOS 304 and the NMOS 310 and consequently, to switch the resistive divider circuit 326 into the line driver circuit 106. The resistive divider circuit 326 can drive the communication medium and can maintain a constant common mode voltage level. In some implementations, the resistors 306 and 308 can have the same resistance value (R). The resistors 306 and 308 can be selected so that the resistance value is much larger than the impedance of the communication medium transferred to the primary terminal of the transformer that is connected to the transmitter unit to minimize coupling of the received PLC signal from the powerline medium to the transmitter unit 102.

It is noted that for simplicity, FIG. 2B and FIG. 3 depict the transmitter unit and the receiver unit connected in single ended mode. However, in other implementations, the transmitter unit and the receiver unit can be connected in fully differential mode.

Figure 4:
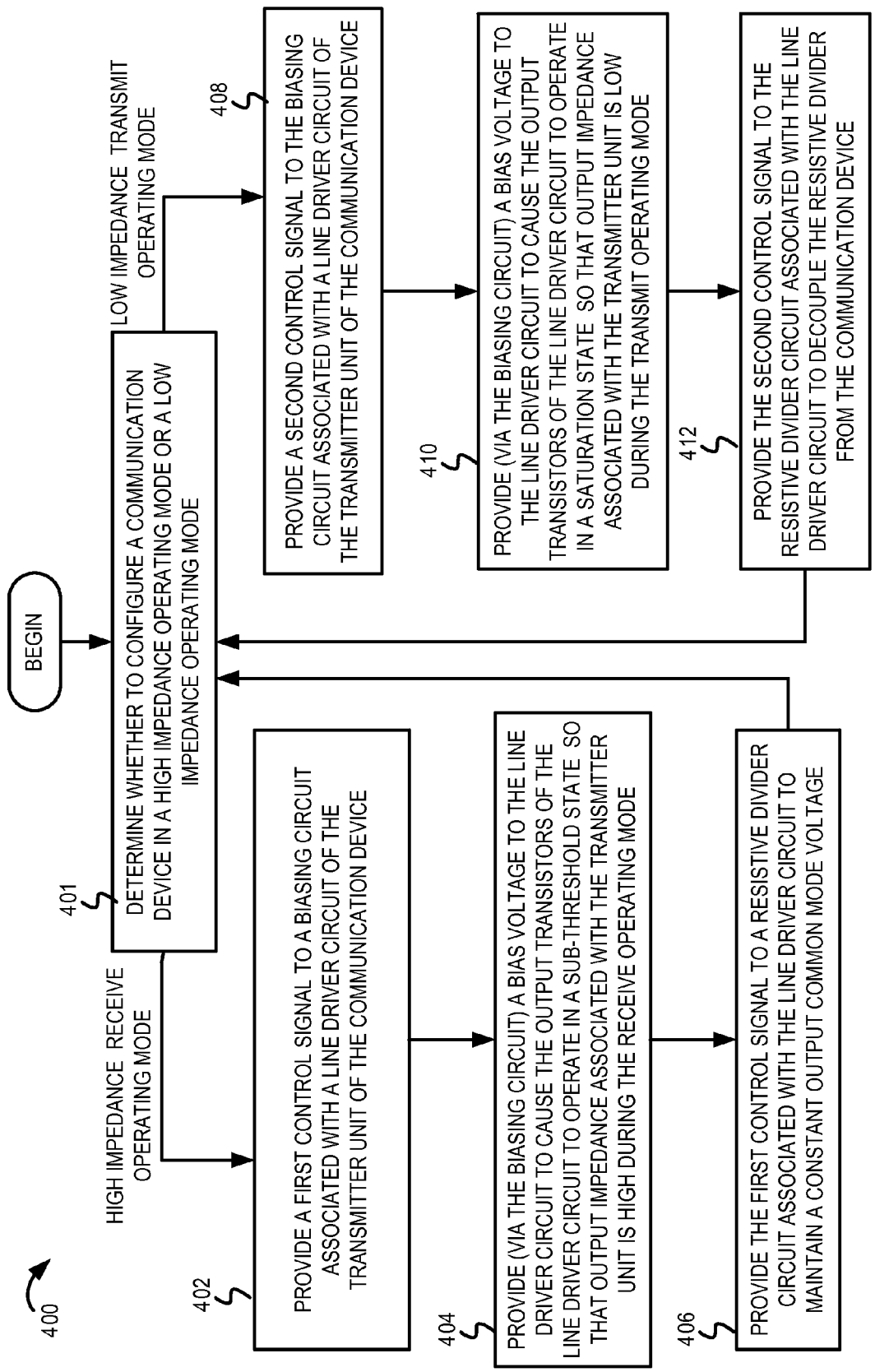
FIG. 4 is a flow diagram illustrating example operations for tri-state control of a line driver.

FIG. 4 is a flow diagram ("flow") 400 illustrating example operations for tri-state control of a line driver. The flow 400 begins at block 401.

At block 401, it is determined whether to configure a communication device in a high impedance operating mode or a low impedance operating mode. For example, the transmitter unit 102 may be configured in the high impedance operating mode when the communication device 100 is scheduled to receive one or more packets. The transmitter unit 102 may be configured in the low impedance operating mode when the communication device 100 is scheduled to transmit one or more packets to other communication device. In some implementations, the operating mode control unit 108 of FIG. 1 can determine to switch the communication device 100 between the receive operating mode (i.e., the high impedance receive operating mode) and the transmit operating mode (i.e., the low impedance transmit operating mode) at predetermined periodic time intervals. As another example, the operating mode control unit 108 can determine to switch the communication device 100 between the receive operating mode (i.e., the high impedance receive operating mode) and the transmit operating mode (i.e., the low impedance transmit operating mode), in response to determining that a PLC packet is scheduled to be received, in response to determining that there are no PLC packets to be transmitted, in response to detecting a pending communication, in accordance with a communication schedule, etc. If it is determined that the communication device 100 should be configured in the high impedance receive operating mode, the flow continues at block 402. If it is determined that the communication device 100 should be configured in the low impedance transmit operating mode, the flow continues at block 408.

At block 402, in response to determining to configure the communication device in the high impedance receive operating mode, a first operating mode control signal is provided to the biasing circuit associated with the line driver circuit of the transmitter unit. For example, in response to determining to configure the communication device 100 in the high impedance operating mode (e.g., the receive operating mode), the operating mode control unit 108 can provide a first predetermined operating mode control signal to the biasing circuit 104 associated with the line driver circuit 106 of the transmitter unit 102. As depicted in the example of FIG. 2B, the first operating mode control signal can enable and cause the PMOS 206 and the NMOS 214 to operate in the saturation mode. This, in turn, can short the PMOS 208 and the NMOS 216, respectively. As described above in FIG. 1 and FIG. 2B, the first operating mode control signal can cause the biasing circuit 104 to generate a bias voltage to bias the output transistors of the line driver circuit 106 in the sub-threshold state. The flow continues at block 404.

At block 404, a bias voltage is provided to the line driver circuit to cause the output transistors of the line driver circuit to operate in the sub-threshold state. For example, as described above in FIGS. 1-3, providing the first operating mode control signal to the biasing circuit 104 enables the PMOS 206 and the NMOS 214 (consequently shorts the PMOS 208 and the NMOS 216) and causes the PMOS 210 and the NMOS 218 to generate sub-threshold bias voltages (BIAS_P 222 and BIAS_N 224 respectively). The sub-threshold bias voltages can be any suitable voltage between the cut-off voltage and the threshold voltage. The biasing circuit 104 can provide the sub-threshold bias voltages to the line driver circuit 106 to bias the output transistors of the line driver circuit 106 (i.e., the PMOS 312 and the NMOS 314) in the sub-threshold state. Also, as described above in FIGS. 1-3, biasing the output transistors 312 and 314 of the line driver circuit 106 in the sub-threshold state can result in a high output impedance associated with the transmitter unit 102 (as compared to the impedance of the receiver unit 110) during the receive operating mode. The flow continues at block 406.

At block 406, the first operating mode control signal is provided to a resistive divider circuit associated with the line driver. For example, after the output transistors 312 and 314 of the line driver circuit 106 are biased in the sub-threshold state, the operating mode control unit 108 can provide the first operating mode control signal to the PMOS 304 and the NMOS 310 to enable the resistive divider circuit 326 associated with the line driver circuit 106 (i.e., to couple the resistive divider circuit 326 with the communication medium). The resistive divider circuit 326 can drive the communication medium and can maintain a constant common mode voltage level when the communication device 100 is configured in the receive operating mode. It should be noted that although FIG. 4 depicts the operations of blocks 404 and 406 being performed sequentially, embodiments are not so limited. In other embodiments, the operations of blocks 404 and 406 can be performed simultaneously or in parallel. In other embodiments, the operations of block 406 can be executed prior to the operations of block 404. From block 406, the flow loops back to block 402 where the operating mode control unit 108 can determine whether to switch the communication device 100 to the low impedance transmit operating mode or whether the communication device 100 should remain in the high impedance receive operating mode.

At block 408, in response to determining to configure the communication device in the low impedance transmit operating mode, a second operating mode control signal is provided to the biasing circuit associated with the line driver circuit of the transmitter unit. For example, in response to determining to configure the communication device 100 in the low impedance operating mode (e.g., the transmit operating mode), the operating mode control unit 108 can provide a second predetermined operating mode control signal to the biasing circuit 104. As described above in FIGS. 1 and 2, the second operating mode control signal can cause the biasing circuit 104 to generate a bias voltage to bias the output transistors of the line driver circuit 106 in the saturation state. The flow continues at block 410.

At block 410, a bias voltage is provided to the line driver circuit to cause the output transistors of the line driver circuit to operate in the saturation state. For example providing the second operating mode control signal (or removing the first operating mode control signal) to the biasing circuit 104 disables the PMOS 206 and the NMOS 214. Consequently, the PMOSs 208 and 210, and the NMOSs 216 and 218 can generate the threshold voltage BIAS_P 222 and BIAS_N 224, respectively, that may be needed to bias the output transistors 312 and 314 of the line driver circuit 106 in the saturation state. Also, as described above in FIGS. 1-3, by biasing the output transistors 312 and 314 of the line driver circuit 106 in the saturation state, the output impedance associated with the transmitter unit 102 can be made very small (as compared to the impedance of the receiver unit 110) during the transmit operating mode. The flow continues at block 412.

At block 412, the second control signal is provided to the resistive divider circuit associated with the line driver circuit to decouple the resistive divider from the output. For example, after the output transistors 312 and 314 of the line driver circuit 106 are biased in the saturation state, the operating mode control unit 108 can provide the second operating mode control signal to the PMOS 304 and the NMOS 310 to disable the resistive divider circuit 326 associated with the line driver circuit 106 (i.e., to disengage the resistive divider circuit 326 from the communication medium). It should be noted that although FIG. 4 depicts the operations of blocks 410 and 412 being performed sequentially, embodiments are not so limited. In other embodiments, the operations of blocks 410 and 412 can be performed simultaneously or in parallel. In other embodiments, the operations of block 412 can be executed prior to the operations of block 410. From block 412, the flow loops back to block 402 where the operating mode control unit 108 can determine whether to switch the communication device 100 to the high impedance receive operating mode or whether the communication device 100 should remain in the low impedance transmit operating mode.

It should be understood that FIGS. 1-4 are examples meant to aid in understanding embodiments and should not be used to limit embodiments or limit scope of the claims. Embodiments may comprise additional circuit components, different circuit components, and/or may perform additional operations, fewer operations, operations in a different order, operations in parallel, and some operations differently. In some implementations, as depicted in the example of FIG. 1, the communication device 100 may be a PLC device and may be directly coupled to the powerline medium or maybe coupled via a 1:1 transformer 114. In other implementations, the transformer 114 can comprise any suitable number of turns in the primary winding and the secondary winding depending on the output load, the power supply voltage, etc. For example, the communication device 100 can be coupled to the powerline medium via a 1:4 transformer if the processing units of the communication device 100 are configured to operate on a power supply of 3V and if the load device is configured to operate on a power supply of 12V. The ratio of the number of turns in the primary winding and the secondary winding can also be varied to boost output swing, for impedance matching, and for impedance transformation. For example, if the output impedance of the transmitter unit 102 with respect to the powerline medium is required to be 50 ohms, the output impedance of the transmitter unit 102 before a 1:3 transformer may only need to be approximately 5 ohms (i.e., 50 ohms/$3^2$). In some implementations, the transformer 114 can be configured to have different turn ratios for coupling the powerline medium to the transmitter unit 102 and the receiver unit 110. For example, the transformer can be configured to have a 3:3 turn ratio for coupling the receiver unit 110 to the powerline medium and can be configured to have a 1:3 turn ratio for coupling the transmitter unit 102 to the powerline medium.

Although FIG. 3 depicts an operating mode control signal being provided to enable or disable the resistive divider circuit 326 depending on whether or not the output transistors of the line driver circuit 106 are biased in the sub-threshold state, embodiments are not so limited. In other embodiments, the resistive divider circuit 326 can be permanently enabled in the line driver circuit 106 irrespective of whether the output transistors of the line driver circuit 106 are biased in the sub-threshold state. In other words, the resistive divider circuit 326 may not be disabled when the communication device 100 is configured in the transmit operating mode (as described above). The values of the resistors 306 and 308 can be selected to be much larger than the output impedance associated with the transmitter unit 102 so that the PLC signal to be transmitted is not coupled to the resistive divider circuit 326 in the transmit operating mode.

It is noted that although FIG. 1 depicts the communication device 100 employing a transformer 114 to couple the transmitter unit 102 and the receiver unit 110 to the communication medium, in other embodiments other suitable coupling mechanisms can be employed. Furthermore, the tri-state control mechanism described herein can be implemented by various communication devices and standards, such as powerline communication devices, Ethernet communication devices, etc. Finally, although the Figures depict the biasing circuit 104 and the line driver circuit 106 comprising MOSFETs, other embodiments of the biasing circuit 104 and the line driver circuit 106 can employ various other transistors including bipolar junction transistors (BJTs), junction field effect transistors (JFETs), complementary MOSFETs (CMOS), or a combination thereof.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 5:
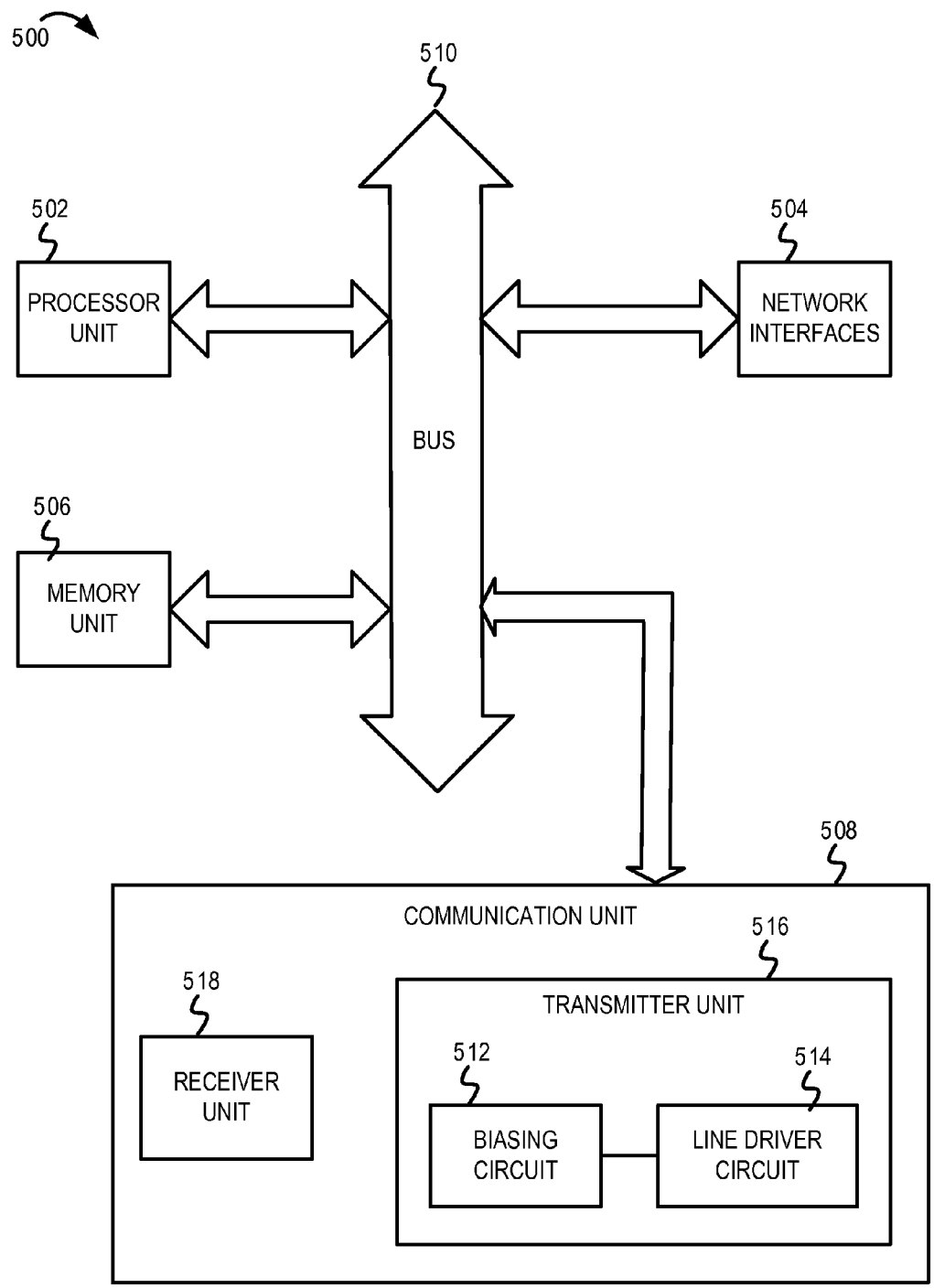
FIG. 5 is a block diagram of one embodiment of an electronic device including a tri-state control mechanism for a line driver.

FIG. 5 is a block diagram of one embodiment of an electronic device 500 including a tri-state control mechanism for a line driver. In some implementations, the electronic device 500 may be one of a personal computer (PC), a notebook, a tablet computer, a netbook, a mobile phone, a gaming console, a mobile phone, a personal digital assistant (PDA), a smart appliance, or other electronic devices configured for powerline communication via a powerline medium. In other implementations, the electronic device 500 can be any suitable electronic device configured to exchange communications via other suitable communication media and using other suitable communication standards (e.g., Ethernet). The electronic device 500 includes a processor unit 502 (possibly including multiple processors, multiple cores, multiple nodes, and/or implementing multi-threading, etc.). The electronic device 500 includes a memory unit 506. The memory unit 506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 500 also includes a bus 510 (e.g., PCI, ISA, PCI-Express, HyperTransport®, InfiniBand®, NuBus, AHB, AXI, etc.), and network interfaces 504 that include at least one of a wireless network interface (e.g., a WLAN interface, a Bluetooth® interface, a WiMAX interface, a ZigBee® interface, a Wireless USB interface, etc.) and a wired network interface (e.g., a powerline interface, an ATM interface, an Ethernet interface, a Frame Relay interface, SONET interface, etc.).

The electronic device 500 also comprises a communication unit 508. The communication unit 508 comprises a transmitter unit 516 and a receiver unit 518. The transmitter unit 516 comprises a biasing circuit 512 and a line driver circuit 514. As described above with reference to FIGS. 1-4, when the communication unit 508 is configured in a receive operating mode, the biasing circuit 512 can receive a predetermined operating mode control signal. In response to the operating mode control signal, the biasing circuit 512 can generate and provide an appropriate bias voltage to the line driver circuit 514 to bias the output transistors of the line driver circuit 514 in the sub-threshold state. Any one of these functionalities may be partially (or entirely) implemented in hardware and/or on the processor unit 502. For example, the functionality may be implemented with an application specific integrated circuit, in logic implemented in the processor unit 502, in a co-processor on a peripheral device or card, etc. Further, realizations may include fewer or additional components not illustrated in FIG. 5 (e.g., video cards, audio cards, additional network interfaces, peripheral devices, etc.). The processor unit 502, the memory unit 506, and the network interfaces 506 are coupled to the bus 510. Although illustrated as being coupled to the bus 510, the memory unit 506 may be coupled to the processor unit 502.

While the embodiments are described with reference to various implementations and exploitations, it will be understood that these embodiments are illustrative and that the scope of the inventive subject matter is not limited to them. In general, techniques for tri-state control for a line driver as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A communication device comprising:
a receiver unit operable to receive one or more signals via a communication medium when the communication device is configured in a receive operating mode; and
a transmitter unit operable to transmit one or more signals via the communication medium when the communication device is configured in a transmit operating mode, wherein the transmitter unit comprises:
a line driver circuit operable to amplify the one or more signals transmitted via the communication medium when the communication device is configured in the transmit operating mode; and
a biasing circuit coupled with the line driver circuit, the biasing circuit operable to:
generate a first bias voltage to bias output transistors of the line driver circuit in a sub-threshold state in response to receiving a first control signal when the communication device is configured in the receive operating mode;
generate a second bias voltage to bias output transistors of the line driver circuit in a saturation state in response to receiving a second control signal when the communication device is configured in the transmit operating mode.

2. The communication device of claim 1, wherein the biasing circuit comprises:
a first p-channel transistor, wherein a drain terminal of the first p-channel transistor is coupled with a gate terminal of the first p-channel transistor, wherein a source terminal of the first p-channel transistor is coupled with a power supply;
a second p-channel transistor, wherein a drain terminal of the second p-channel transistor is coupled with a gate terminal of the second p-channel transistor, wherein the gate terminal of the second p-channel transistor is coupled with the line driver circuit, wherein a source terminal of the second p-channel transistor is coupled with a junction of the drain terminal and the gate terminal of the first p-channel transistor, wherein a junction of the drain terminal and the gate terminal of the second p-channel transistor is coupled with a ground terminal;

a first switch device, wherein a first terminal of the first switch device is coupled with the power supply and a second terminal of the first switch device is coupled with the gate terminal of the first p-channel transistor, wherein a control terminal of the first switch device is operable to receive the control signal;

a first n-channel transistor, wherein a drain terminal of the first n-channel transistor is coupled with a gate terminal of the first n-channel transistor, wherein a junction of the drain terminal and the gate terminal of the first n-channel transistor is coupled with the power supply, wherein the gate terminal of the first n-channel transistor is coupled with the line driver circuit;

a second n-channel transistor, wherein a drain terminal of the second n-channel transistor is coupled with a gate terminal of the second n-channel transistor, wherein a junction of the drain terminal and the gate terminal of the second n-channel transistor is coupled with a source terminal of the first p-channel transistor, wherein a source terminal of the second n-channel transistor is coupled with the ground terminal; and a second switch device coupled with the second n-channel transistor, wherein a first terminal of the second switch device is coupled with the ground terminal and a second terminal of the second switch device is coupled with the gate terminal of the second n-channel transistor, wherein a control terminal of the second switch device is operable to receive the control signal.

3. The communication device of claim 2, wherein the line driver circuit comprises:

a third p-channel transistor coupled with a third n-channel transistor, wherein a drain terminal of the third p-channel transistor is coupled with a source terminal of the third n-channel transistor, a source terminal of the third p-channel transistor is coupled with a drain terminal of the third n-channel transistor, a gate terminal of the third p-channel transistor is coupled with the gate terminal of the second p-channel transistor of the biasing circuit, a gate terminal of the third n-channel transistor is coupled with the gate terminal of the first n-channel transistor of the biasing circuit, wherein a junction of the drain terminal of the third p-channel transistor and the source terminal of the third n-channel transistor is coupled with the ground terminal, wherein a junction of the source terminal of the third p-channel transistor and the drain terminal of the third n-channel transistor is coupled with the power supply; and a p-channel output transistor of the line driver circuit coupled with an n-channel output transistor of the line driver circuit, wherein a source terminal of the p-channel output transistor is coupled with the power supply, a drain terminal of the p-channel output transistor is coupled with a drain terminal of the n-channel output transistor, a source terminal of the n-channel output transistor is coupled with the ground terminal, wherein a gate terminal of the p-channel output transistor is coupled with the junction of the source terminal of the third p-channel transistor and the drain terminal of the third n-channel transistor, wherein a gate terminal of the n-channel output transistor is coupled with the junction of the drain terminal of the third p-channel transistor and the source terminal of the third n-channel transistor is coupled with the ground terminal, wherein a junction of the drain terminal of the p-channel output transistor and the drain terminal of the n-channel output transistor is an output terminal of the line driver circuit.

4. The communication device of claim 1, wherein the biasing circuit operable to generate the first bias voltage to bias the output transistors of the line driver circuit in the sub-threshold state comprises the biasing circuit operable to:

apply the first bias voltage to a gate terminal of each of the output transistors of the line driver circuit to bias the output transistors in an intermediate operating state between a cut-off state associated with the output transistors and the saturation state associated with the output transistors, wherein the output transistors are switched off when configured in the cut-off state, wherein the output transistors are switched on when configured in the saturation state.

5. The communication device of claim 1, wherein the line driver circuit is coupled with a resistive divider circuit and wherein the resistive divider circuit is operable to:

receive the first control signal to maintain a constant output common mode voltage at an output terminal of the resistive divider circuit when the communication device is configured in the receive operating mode.

receive the second control signal to the resistive divider circuit to decouple the resistive divider circuit from the communication medium when the communication device is configured in the transmit operating mode.

6. The communication device of claim 1, wherein the transmitter unit and the receiver unit are coupled with each other in differential mode, wherein the communication device is coupled with the communication medium such that the transmitter unit is coupled with a first primary port of a transformer, the receiver unit is coupled with a second primary port of the transformer, and a secondary port of the transformer is coupled with the communication medium.

7. The communication device of claim 1, further comprising an operating mode control unit operable to:

determine whether the communication device is configured in the transmit operating mode or the receive operating mode;

generate the first control signal in response to determining that the communication device is configured in the receive operating mode; and generate the second control signal that is different from the first control signal in response to determining that the communication device is configured in the transmit operating mode.

8. An apparatus comprising:

a line driver circuit; and a biasing circuit coupled with the line driver circuit, the biasing circuit comprising:

a first p-channel transistor, wherein a drain terminal of the first p-channel transistor is coupled with a gate terminal of the first p-channel transistor, wherein a source terminal of the first p-channel transistor is coupled with a power supply;

a second p-channel transistor, wherein a drain terminal of the second p-channel transistor is coupled with a gate terminal of the second p-channel transistor, wherein the gate terminal of the second p-channel transistor is coupled with the line driver circuit, wherein a source terminal of the second p-channel transistor is coupled with a junction of the drain terminal and the gate terminal of the first p-channel transistor, wherein a junction of the drain terminal and the gate terminal of the second p-channel transistor is coupled with a ground terminal;

a first switch device, wherein a first terminal of the first switch device is coupled with the power supply and a second terminal of the first switch device is coupled with the gate terminal of the first p-channel transistor, wherein a control terminal of the first switch device is operable to receive an operating mode control signal;

a first n-channel transistor, wherein a drain terminal of the first n-channel transistor is coupled with a gate terminal of the first n-channel transistor, wherein a junction of the drain terminal and the gate terminal of the first n-channel transistor is coupled with the power supply, wherein the gate terminal of the first n-channel transistor is coupled with the line driver circuit;

a second n-channel transistor, wherein a drain terminal of the second n-channel transistor is coupled with a gate terminal of the second n-channel transistor, wherein a junction of the drain terminal and the gate terminal of the second n-channel transistor is coupled with a source terminal of the first p-channel transistor, wherein a source terminal of the second n-channel transistor is coupled with the ground terminal; and a second switch device coupled with the second n-channel transistor, wherein a first terminal of the second switch device is coupled with the ground terminal and a second terminal of the second switch device is coupled with the gate terminal of the second n-channel transistor, wherein a control terminal of the second switch device is operable to receive the operating mode control signal.

9. The apparatus of claim 8, wherein
the first switch device is operable to:
receive the operating mode control signal at the control terminal of the first switch device, wherein the operating control mode signal indicates that the line driver circuit will be disabled;
operate in a saturation mode in response to the first switch device receiving the operating mode control signal; and
short the first p-channel transistor by coupling the first p-channel transistor to the power supply based on the first switch device operating in the saturation mode; and
the second switch device is operable to:
receive a logical inverse of the operating mode control signal at the control terminal of the second switch device that indicates that the line driver circuit will be disabled;
operate in the saturation mode in response to the second switch device receiving the logical inverse of the operating mode control signal; and
short the second n-channel transistor by coupling the second n-channel transistor to the ground terminal based on the second switch device operating in the saturation mode.

10. The apparatus of claim 9, wherein in response to the first switch device shorting the first p-channel transistor by coupling the first p-channel transistor to the power supply based on the first switch device operating in the saturation mode, the second p-channel transistor is operable to:
generate a sub-threshold bias voltage across the gate terminal and the source terminal of the second p-channel transistor; and
apply the sub-threshold bias voltage to the line driver circuit to bias output transistors of the line driver circuit in a sub-threshold mode.

11. The apparatus of claim 10, wherein in response to the second switch device shorting the second n-channel transistor by coupling the second n-channel transistor to the ground terminal based on the second switch device operating in the saturation mode, the first n-channel transistor is operable to:
generate the sub-threshold bias voltage across the gate terminal and the source terminal of the first n-channel transistor; and
apply the sub-threshold bias voltage to the line driver circuit to bias output transistors of the line driver circuit in the sub-threshold mode.

12. The apparatus of claim 11, wherein the sub-threshold mode is a high impedance mode, wherein the sub-threshold bias voltage is a voltage level that lies between a cut-off voltage level associated with the output transistors of the line driver circuit and a saturation voltage level associated with the output transistors of the line driver circuit.

13. The apparatus of claim 8, wherein,
the first switch device is operable to:
receive the operating mode control signal at the control terminal of the first switch device, wherein the operating mode control signal indicates that the line driver circuit will be enabled; and
disable the first switch device in response to the first switch device receiving the operating mode control signal; and
the second switch device is operable to:
receive a logical inverse of the operating mode control signal at the control terminal of the second switch that indicates that the line driver circuit will be enabled; and
disable the second switch device in response to the second switch device receiving the inverse of the operating mode control signal at the second switch device.

14. The apparatus of claim 13, wherein in response to disabling the first switch device in response to the first switch device receiving the operating mode control signal, the first p-channel transistor and the second p-channel transistor are operable to:
generate a saturation bias voltage across the first p-channel transistor and the second p-channel transistor; and
apply the saturation bias voltage to the line driver circuit to bias output transistors of the line driver circuit in a saturation mode.

15. The apparatus of claim 13, wherein in response to disabling the second switch device in response to the second switch device receiving the logical inverse of the operating mode control signal, the first n-channel transistor and the second n-channel transistor are operable to:
generate a saturation bias voltage across the first n-channel transistor and the second n-channel transistor; and
apply the saturation bias voltage to the line driver circuit to bias output transistors of the line driver circuit in a saturation mode.

16. The apparatus of claim 8, wherein the line driver circuit comprises:
a third p-channel transistor coupled with a third n-channel transistor, wherein a drain terminal of the third p-channel transistor is coupled with a source terminal of the third n-channel transistor, a source terminal of the third p-channel transistor is coupled with a drain terminal of the third n-channel transistor, a gate terminal of the third p-channel transistor is coupled with the gate terminal of the second p-channel transistor of the biasing circuit, a gate terminal of the third n-channel transistor is coupled with the gate terminal of the first n-channel transistor of the biasing circuit, wherein a junction of the drain terminal of the third p-channel transistor and the source terminal of the third n-channel transistor is coupled with the ground terminal, wherein a junction of the source terminal of the third p-channel transistor and the drain terminal of the third n-channel transistor is coupled with the power supply; and a p-channel output transistor of the line driver circuit coupled with an n-channel output transistor of the line driver circuit, wherein a source terminal of the p-channel output transistor is coupled with the power supply, a drain terminal of the p-channel output transistor is coupled with a drain terminal of the n-channel output transistor, a source terminal of the n-channel output transistor is coupled with the ground terminal, wherein a gate terminal of the p-channel output transistor is coupled with the junction of the source terminal of the third p-channel transistor and the drain terminal of the third n-channel transistor, wherein a gate terminal of the n-channel output transistor is coupled with the junction of the drain terminal of the third p-channel transistor and the source terminal of the third n-channel transistor is coupled with the ground terminal, wherein a junction of the drain terminal of the p-channel output transistor and the drain terminal of the n-channel output transistor is an output terminal of the line driver circuit.

17. The apparatus of claim 16,
wherein the first switch device is a fourth p-channel transistor, wherein a source terminal of the fourth p-channel transistor is coupled with the power supply, wherein a drain terminal of the fourth p-channel transistor is coupled with the gate terminal of the first p-channel transistor, wherein a gate terminal of the fourth p-channel transistor is the control terminal operable to receive the operating mode control signal; and
wherein the second switch device is a fourth n-channel transistor, wherein a source terminal of the fourth n-channel transistor is coupled with the ground terminal, wherein a drain terminal of the fourth n-channel transistor is coupled with the gate terminal of the second n-channel transistor, wherein a gate terminal of the fourth n-channel transistor is the control terminal operable to receive the operating mode control signal.

18. The apparatus of claim 16, wherein the line driver circuit further a comprises a resistive divider circuit,
wherein the resistive divider circuit comprises a first output switch device, a second output switch device, a first output resistor, and a second output resistor,
wherein a first terminal of the first output switch device is coupled with the power supply, a second terminal of the first output switch device is coupled with a first terminal of the first output resistor; a second output terminal of the first output resistor is coupled with a first terminal of the second output resistor, a second terminal of the second output resistor is coupled with a first terminal of the second output switch device, and a second terminal of the second output switch device is coupled with the ground terminal, wherein a control terminal of the first output switch device and a control terminal of the second output switch device are operable to receive the operating mode control signal; and
wherein the second terminal of the first output resistor and the first terminal of the second output resistor are coupled with the output terminal of the line driver circuit.

19. The apparatus of claim 18:
wherein the first output switch device is a fourth p-channel transistor, wherein a drain terminal of the fourth p-channel transistor is coupled with the power supply, wherein a source terminal of the fourth p-channel transistor is coupled with the first terminal of the first resistor, wherein a gate terminal of the fourth p-channel transistor is the control terminal operable to receive the operating mode control signal; and
wherein the second output switch device is a fourth n-channel transistor, wherein a drain terminal of the fourth n-channel transistor is coupled with the ground terminal, a source terminal of the fourth n-channel transistor is coupled with the second terminal of the second resistor, wherein a gate terminal of the fourth n-channel transistor is the control terminal operable to receive the operating mode control signal.

20. The apparatus of claim 18, wherein the resistive divider circuit is operable to:
receive the operating mode control signal at the control terminal of the first switch device and at the control terminal of the second switch device, wherein the operating mode control signal indicates that the line driver circuit will be enabled; and
disable the first switch device and the second switch device to decouple the resistive divider circuit from the line driver circuit in response to the resistive divider circuit receiving the operating mode control signal that indicates that the line driver circuit will be enabled.

21. The apparatus of claim 18, wherein the resistive divider circuit is operable to:
receive the operating mode control signal at the control terminal of the first switch device and at the control terminal of the second switch device, wherein the operating mode control signal indicates that the line driver circuit will be disabled; and
enable the first switch device and the second switch device to maintain a constant common mode voltage at the output terminal of the line driver circuit in response to the resistive divider circuit receiving the operating mode control signal that indicates that the line driver circuit will be disabled.

22. A method comprising:
determining, at a communication device, whether the communication device is configured in a transmit operating mode or a receive operating mode;
in response to determining that the communication device is configured in the receive operating mode,
generating a first operating mode control signal that indicates that the communication device is configured in the receive operating mode;
generating a first bias voltage to bias output transistors of a line driver circuit of the communication device in a sub-threshold state based on said generating the first operating mode control signal that indicates that the communication device is configured in the receive operating mode;
in response to determining that the communication device is configured in the transmit operating mode,
generating a second operating mode control signal that indicates that the communication device is configured in the transmit operating mode;
generating a second bias voltage to bias output transistors of the line driver circuit in a saturation state based on said generating the second operating mode control signal that indicates that the communication device is configured in the transmit operating mode.

23. The method of claim 22, wherein the sub-threshold state is an intermediate operating state between a cut-off state associated with the output transistors and the saturation state associated with the output transistors, wherein the output transistors are switched off when configured in the cut-off state, wherein the output transistors are switched on when configured in the saturation state.

24. The method of claim 22, further comprising:
in response to determining that the communication device is configured in the receive operating mode,
providing the first operating mode control signal to a resistive divider circuit of the communication device to maintain a constant output common mode voltage at an output terminal of the resistive divider circuit; and
in response to determining that the communication device is configured in the receive operating mode,
providing the second operating mode control signal to the resistive divider circuit to decouple the resistive divider circuit from a communication medium with which the communication device is coupled.

* * * * *